Aug. 18, 1925.
H. P. KRAFT
1,550,032
QUICK ACTING PUMP COUPLING
Filed May 20, 1921
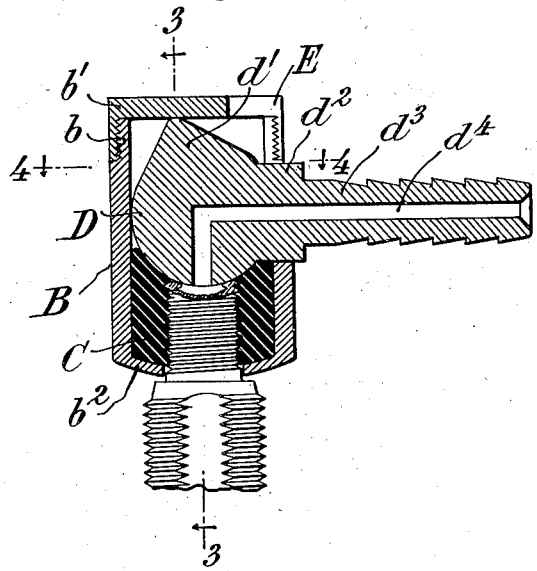
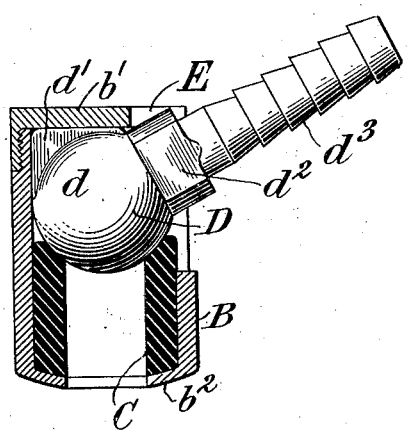
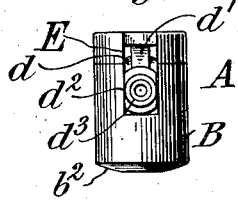
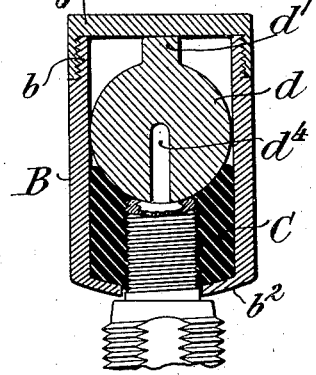
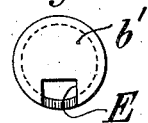
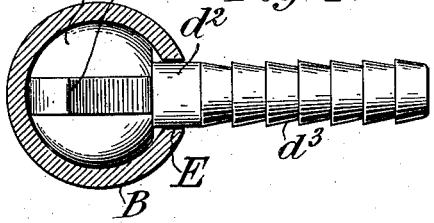
Inventor
Henry Phillip Kraft,
By Attorneys.

Patented Aug. 18, 1925.

1,550,032

UNITED STATES PATENT OFFICE.

HENRY PHILLIP KRAFT, OF RIDGEWOOD, NEW JERSEY; EDGAR J. PHILLIPS AND EARL A. DARR EXECUTORS OF THE WILL OF HENRY P. KRAFT, DECEASED.

QUICK-ACTING PUMP COUPLING.

Application filed May 20, 1921. Serial No. 471,275.

*To all whom it may concern:*

Be it known that I, HENRY PHILLIP KRAFT, a citizen of the United States of America, residing in Edgewood, in the county of Bergen and State of New Jersey, have invented certain new and useful Improvements in Quick-Acting Pump Couplings, of which the following is a specification.

The present invention relates to pump couplings and aims to provide certain improvements therein.

The present invention is particularly directed to that type of pump coupling employed in conjunction with hand or power operated pumps, whereby a quick attachment and detachment of said coupling with a tire valve or the like may be made, and one which will provide a satisfactory union between the coupled parts.

According to the present invention, I provide a coupling member preferably consisting of an elongated open ended casing or shell adapted to fit over a valve nipple or other threaded member, within which is positioned a substantially cylindrical sleeve or clamping ring adapted to have its normal internal diameter decreased to engage the valve nipple. To produce a decrease in the diameter of the clamping ring for the purpose set forth there is provided a compression member formed with a cam surface adapted to exert a downward force against the clamping ring, when said member is tilted or moved through an arc. The coupling is also designed to provide for the ready removability and replacement of the sleeve or clamping ring when such action becomes necessary.

The invention also includes other features of improvement which will be hereinafter more fully set forth.

Referring to the drawings which show one embodiment of the invention:

Figure 1 is a longitudinal section of the coupling applied to a valve nipple.

Fig. 2 is a similar section, showing the compression member and shank in elevation.

Fig. 3 is a section of Fig. 1 taken substantially on the line 3—3.

Fig. 4 is a section of Fig. 1 taken on the line 4—4.

Fig. 5 is an end elevation of the coupling.

Fig. 6 is a top plan view of the coupling shell.

Referring to the drawings let A indicate the pump coupling as a whole consisting of a shell or casing B housing a clamping member C and a compression member D, formed with the usual ridged shank for engagement with a hose. The casing or shell B as herein shown preferably consists of an open ended cylindrical sleeve having its ends formed of reduced thickness, one end $b$, of which is formed of reduced external diameter and screw threaded to accommodate an internally screw threaded cap portion $b'$ which serves, both as a closure for the casing and as a bearing face for the cam surface on the compression means hereinafter to be described, while the opposite end $b^2$ is preferably formed as a tapered edge which is spun or bent inwardly to serve as a guide for the coupling and as a support for the clamping member C. This member C as herein shown, is in the form of a cylindrical sleeve of compressible material such as rubber or its equivalent, but it is to be understood that any means adapted to have its normal diameter decreased will fall within the province of my invention.

To decrease the normal diameter of the clamping member to bring it into binding engagement with the valve nipple, and at the same time provide a leak-tight seal between the coupling and said valve nipple, I provide a compression member D. As herein disclosed, said member preferably consists of a substantially spherical head $d$, a cam projection $d'$ carried by said spherical head on its face adjacent the cap portion $b'$, a lateral extension $d^2$ formed with opposite flat faces and the ridged shank $d^3$ which serves as a manipulating handle. A duct $d^4$ extends through the compression member D and serves to conduct the inflating fluid from the pump to the tire. To allow for the tilting movement of the compression member D, necessary in the operation of the coupling, a portion of the top and side of the casing B is cut away as shown at E, and the lateral walls provided by this cut away portion serve as guides for the tilting movement of the member D. In the tilting or shifting of the shank $d^3$, from the position shown in Fig. 2 to that of Fig. 1 the spherical head which normally rests on the top of the compressible sleeve C, and is pivotal thereon owing to the ball and socket arrangement, forces the sleeve C downwardly thereby decreasing its diameter, owing to the cam action of the projection $d'$ engaging the top of the casing $b'$. The cam projection $d'$ may be of any desired shape and may if desired be formed on the cap portion instead of on the spherical member.

In operation, to apply the pump coupling to a valve nipple, the coupling which normally is in the position shown in Fig. 2, is merely slipped down over the valve nipple and the manipulating handle or shank $d^3$ tilted or moved downwardly to the position shown in Fig. 1. A secure leak-tight connection between the coupling and the valve stem is the result. To remove the coupling, a tilting of the handle in the reverse direction and a subsequent lifting off of the coupling is all that is necessary.

Although I have shown and described but a single embodiment of the invention it will be understood that various modifications may be resorted to without departing from the spirit of the invention.

What I claim is:—

1. A pump coupling or the like, comprising a casing, a compressible sleeve in said casing, and a tiltable compression member for compressing said sleeve in engagement therewith.

2. A pump coupling or the like, having compressible means adapted to engage a threaded member to hold the coupling thereon and a tiltable compression member in engagement with said means for moving it into engagement with the threaded member.

3. A pump coupling or the like, comprising a casing, a compressible sleeve in said casing, and a tiltable compression member formed with a substantially spherical head for compressing said sleeve.

4. A pump coupling or the like, comprising a casing, a compressible sleeve in said casing, and a tiltable compression member formed with a substantially spherical head for compressing said sleeve, and a cam projection, engaging the casing for compressing said sleeve.

5. A pump coupling or the like, having compressible means adapted to engage a threaded member to hold the coupling thereon and a tiltable compression member for moving said means into engagement with the threaded member, said compression member being formed with an enlarged head engaging the compressible means.

6. A pump coupling or the like, comprising a casing, a compressible sleeve in said casing, and a tiltable compression member, formed with an enlarged head engaging the compressible sleeve and a cam projection engaging the casing for compressing said sleeve.

7. A pump coupling or the like, comprising a casing, a compressible sleeve in said casing, and a tiltable compression member in engagement with said sleeve and having a duct passing therethrough, for compressing said sleeve.

8. A pump coupling or the like, comprising a casing, a compressible sleeve in said casing, and a movable compression member, comprising a substantially spherical head and a hose shank, having a duct passing therethrough, for compressing said sleeve.

9. A pump coupling or the like, comprising a casing, a compressible sleeve in said casing, a tiltable compression member in engagement with said sleeve in said casing and coacting through a cam surface to compress the sleeve.

10. A pump coupling or the like, having means adapted to have its normal diameter decreased to engage a threaded member to hold the coupling thereon, and a tiltable member adapted to engage said means and decrease its diameter.

11. A pump coupling or the like, having means adapted to have its normal diameter decreased to engage a threaded member to hold the coupling thereon, and a tiltable member formed with a substantially spherical head, for decreasing the diameter of said means.

12. A pump coupling or the like, having means adapted to have its normal diameter decreased to engage a threaded member to hold the coupling thereon, and a tiltable member formed with a substantially spherical head, and a cam surface for decreasing the diameter of said means.

13. A pump coupling or the like, comprising a casing, a ring-shaped member adapted to have its normal diameter decreased to engage a threaded member to hold the coupling thereon, and a tiltable member in engagement with said sleeve in said casing and coacting therewith through a cam surface, to decrease the diameter of said ring-shaped member.

14. A pump coupling or the like, comprising a substantially cylindrical casing adapted to be slipped over a valve nipple or the like, a compressible sleeve in said casing and adapted upon being compressed to engage the valve nipple to hold the coupling thereon, a tiltable compression member, formed with an enlarged head in said casing above said compressible sleeve and in engagement therewith and provided with a hose shank extending through a cut-away portion in the side of the casing.

In witness whereof, I have hereunto signed my name.

HENRY PHILLIP KRAFT.

Certificate of Correction.

It is hereby certified that in Letters Patent No. 1,550,032, granted August 18, 1925, upon the application of Henry Phillip Kraft, of Ridgewood, New Jersey, for an improvement in "Quick-Acting Pump Couplings," errors appear in the printed specification requiring correction as follows: In the preamble, line 4, residence of patentee, for "Edgewood" read *Ridgewood;* page 2, line 85, claim 9, after the word "coacting" insert the word *therewith;* and that the said Letters Patent should be read with these corrections therein that the same may conform to the record of the case in the Patent Office.

Signed and sealed this 22d day of September, A. D. 1925.

[SEAL.]

KARL FENNING,
*Acting Commissioner of Patents.*